United States Patent
Li et al.

(10) Patent No.: US 10,422,977 B2
(45) Date of Patent: Sep. 24, 2019

(54) RECONNAISSANCE OBJECTIVE LENS USED FOR UNMANNED AIRCRAFT

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Bo Sun, Shenzhen (CN); Yunfeng Gao, Shenzhen (CN)

(73) Assignee: HAN'S LASER TECHNOLOGY INDUSTRY GROUP CO., LTD., Shenzhen, Guangdong (CN)

( * ) Notice: Subject to any disclaimer, the term of this patent is extended or adjusted under 35 U.S.C. 154(b) by 427 days.

(21) Appl. No.: 15/328,742

(22) PCT Filed: Sep. 5, 2014

(86) PCT No.: PCT/CN2014/085957
§ 371 (c)(1),
(2) Date: Jan. 24, 2017

(87) PCT Pub. No.: WO2016/033788
PCT Pub. Date: Mar. 10, 2016

(65) Prior Publication Data
US 2017/0212328 A1    Jul. 27, 2017

(51) Int. Cl.
*G02B 9/60*    (2006.01)
*G02B 13/02*    (2006.01)

(52) U.S. Cl.
CPC .............. *G02B 9/60* (2013.01); *G02B 13/02* (2013.01)

(58) Field of Classification Search
CPC ..... G02B 9/60; G02B 13/0045; G02B 13/005
(Continued)

(56) References Cited

U.S. PATENT DOCUMENTS 3,887,269 A * 6/1975 Nakagawa ............... G02B 9/60
359/746

FOREIGN PATENT DOCUMENTS

CN    1038172 A    12/1989
CN    2232593 Y    8/1996
(Continued)

OTHER PUBLICATIONS

International Search Report dated May 14, 2015 issued in the corresponding International Application No. PCT/CN2014/085957, pp. 1-2.

*Primary Examiner* — Joseph P Martinez
*Assistant Examiner* — Vipin Patel
(74) *Attorney, Agent, or Firm* — Polsinelli PC

(57) ABSTRACT

A reconnaissance objective lens used for an unmanned aircraft, the reconnaissance objective lens comprising a first lens (L1), a second lens (L2), a third lens (L3), a fourth lens (L4) and a fifth lens (L5) successively and coaxially arranged along the transmission direction of incident light rays. The first lens (L1) is a biconvex lens, the second lens (L2) is a biconcave lens, the third lens (L3) is a meniscus lens, the fourth lens (L4) is a meniscus lens, and the fifth lens (L5) is a meniscus lens. The first lens (L1) and the second lens (L2) are glued to one another, and the fourth lens (L4) and the fifth lens (L5) are glued to one another. By using the rational configuration of the first to fifth lenses (L1-L5) having positive and negative optical power, the reconnaissance objective lens used for an unmanned aircraft effectively solves the technical problem of it being difficult for current reconnaissance objective lenses for unmanned aircraft to achieve a large field of view, high resolution and low distortion.

6 Claims, 5 Drawing Sheets

(58) Field of Classification Search
USPC ........ 359/659, 714, 746, 753, 763, 764, 766
See application file for complete search history.

(56) References Cited

FOREIGN PATENT DOCUMENTS

| | | |
|---|---|---|
| CN | 201698079 U | 1/2011 |
| CN | 201837768 U | 5/2011 |
| CN | 202693896 U | 1/2013 |
| GB | 563359 A | 8/1944 |

* cited by examiner

RECONNAISSANCE OBJECTIVE LENS USED FOR UNMANNED AIRCRAFT

CROSS REFERENCE TO RELATED APPLICATIONS

This application is a National Phase filing and claims priority under 35 U.S.C. § 371 of PCT/CN2014/085957 filed on Sep. 5, 2014. The entire content of the PCT application is hereby incorporated by reference.

FIELD OF THE INVENTION

The present disclosure relates to optical lens, and more particularly relates to a reconnaissance objective lens used for an unmanned aircraft.

BACKGROUND OF THE INVENTION

Currently, unmanned aerial vehicles (UAV) have been widely applied to the modern society, and because the UAV does not require human pilot aboard, it can perform much more dangerous tasks. The most widely application field of the UAV is reconnaissance, i.e. the UAV transmits the aerial reconnaissance photography back to the ground directly and immediately to determine the reconnaissance target.

The UAV can either used in military applications, such as battlefield reconnaissance and surveillance, positioning, damage assessment, electronic warfare, etc, or in civil applications, such as border patrol, nuclear radiation detection, aerial photography, aviation prospecting, disaster monitoring, traffic patrol, and security monitoring, etc.

According to the field, the optical reconnaissance can be divided into low-altitude reconnaissance, mid-altitude reconnaissance and high-altitude reconnaissance. No matter what types of reconnaissance, a major technology has to be used, namely aerial photography. However, the conventional optical lens used for UAV commonly has deficiencies of small view angle, low resolution, high distortion and the like.

SUMMARY OF THE INVENTION

Accordingly, it is necessary to provide a reconnaissance objective lens for an UAV, which has high resolution and low distortion.

A reconnaissance objective lens for an UAV includes: a first lens, a second lens, a third lens, a fourth lens, and a fifth lens, which are successively coaxially configured along a transmission direction of incident light; wherein the first lens is a biconvex lens, the second lens is a biconcave lens, the third lens is a meniscus lens, the fourth lens is a meniscus lens, and the fifth lens is a meniscus lens; wherein the first lens is bonded to the second lens, the fourth lens is bonded to the fifth lens; wherein the first lens has a first surface and a second surface, the second lens has a third surface and a fourth surface, the third lens has a fifth surface and a sixth surface, the fourth lens has a seventh surface and an eighth surface, the fifth lens has a ninth surface and a tenth surface; the first surface to the tenth surface are successively arranged along the transmission direction of the incident light; wherein radii of curvature of the first surface to the tenth surface are 112 mm, −150 mm, −150 mm, 250 mm, 64 mm, 150 mm, −31 mm, −60 mm, −60 mm, and −50 mm respectively; wherein central thicknesses of the first lens to the fifth lens are 12 mm, 4 mm, 8 mm, 8 mm, and 4 mm, respectively.

In one embodiment, ratios of refractive index to Abbe number of the first lens to the fifth lens are 1.5/64, 1.7/32, 1.63/62, 1.6/60, 1.6/40, respectively.

In one embodiment, an interval between the second lens and the third lens is 0.5 mm; an interval between the third lens and the fourth lens is 80 mm.

In one embodiment, outer diameters of the first lens, the second lens, the third lens, the fourth lens, the fifth lens are 70 mm, 70 mm, 60 mm, 20 mm, and 20 mm, respectively.

In one embodiment, the lens further includes an aperture, wherein the aperture is provided on an image side of the fourth lens and configured to control luminous flux entering the fourth lens.

In one embodiment, tolerance ranges of the radii of curvature, the central thicknesses, and the intervals are 5%.

In the foregoing reconnaissance objective lens for the UAV, by a reasonable configuration of the first to fifth lens with the positive and negative optical power, the technical challenge of large field of view, high resolution and low distortion is achieved, which is difficult for the conventional reconnaissance objective lens for the UAV. Therefore, not only the reconnaissance objective lens for the UAV processes advantages such as small size, large imaging frame, high clarity, high resolution, low distortion, large field of view, but it also processes advantages such as large information volume, high efficiency, greatly reduced cost.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Reference will now be made to the drawings to describe, in detail, embodiments of the present invention. Although the invention is illustrated and described herein with reference to specific embodiments, the invention is not intended to be limited to the details shown. Rather, various modifications may be made in the details within the scope and range of equivalents of the claims and without departing from the invention.

Figure 1:
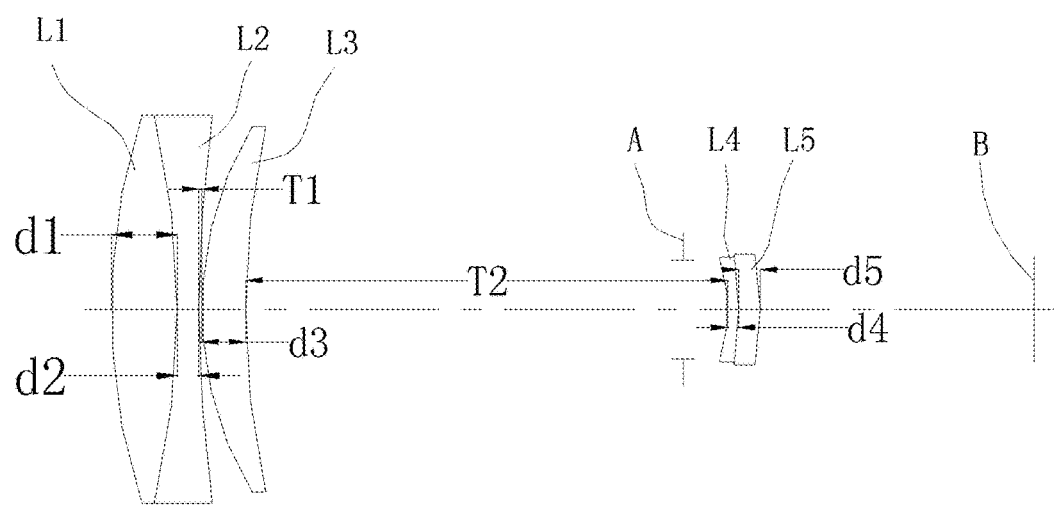
FIG. 1 is a schematic diagram of a reconnaissance objective lens for an UAV according to one embodiment.
Figure 2:
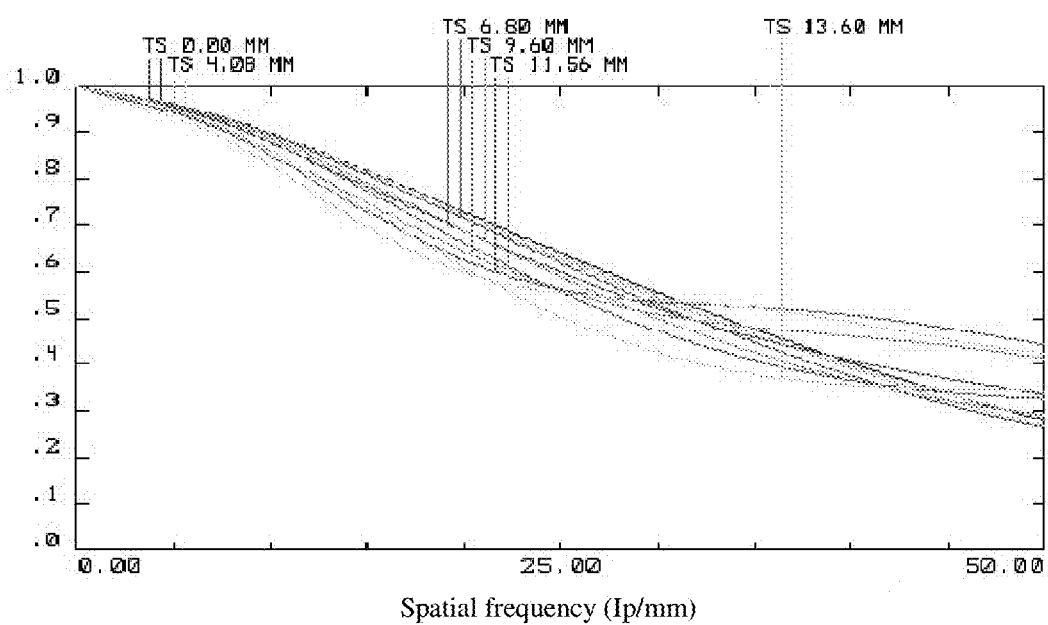
FIG. 2 is a graphic diagram showing a modulation transfer function of the reconnaissance objective lens for the UAV according to one embodiment.
Figure 3:
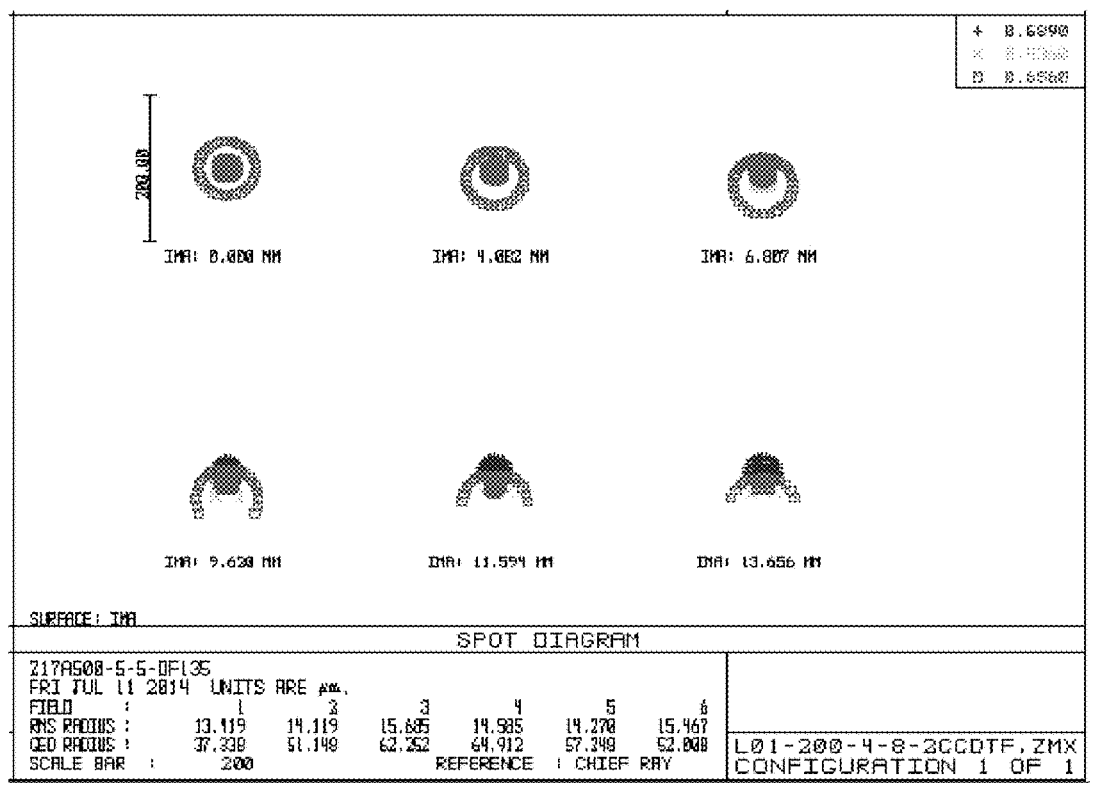
FIG. 3 is a graphic diagram showing a geometric aberration diagram of the reconnaissance objective lens for the UAV according to one embodiment.
Figure 4:
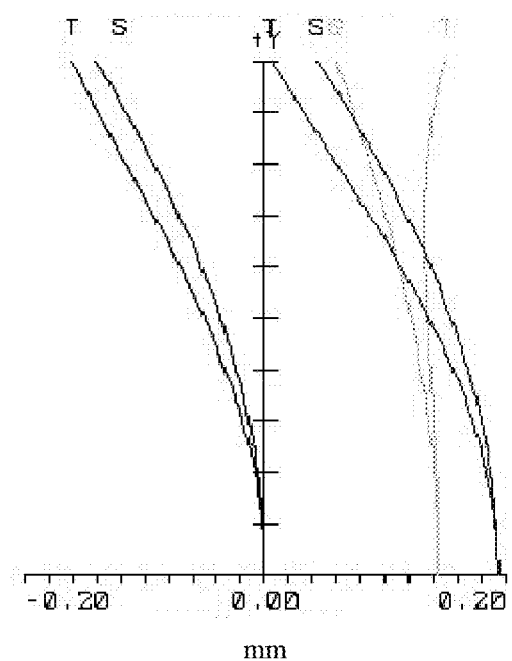
FIG. 4 is a graphic diagram showing field curvature of the reconnaissance objective lens for the UAV according to one embodiment.
Figure 5:
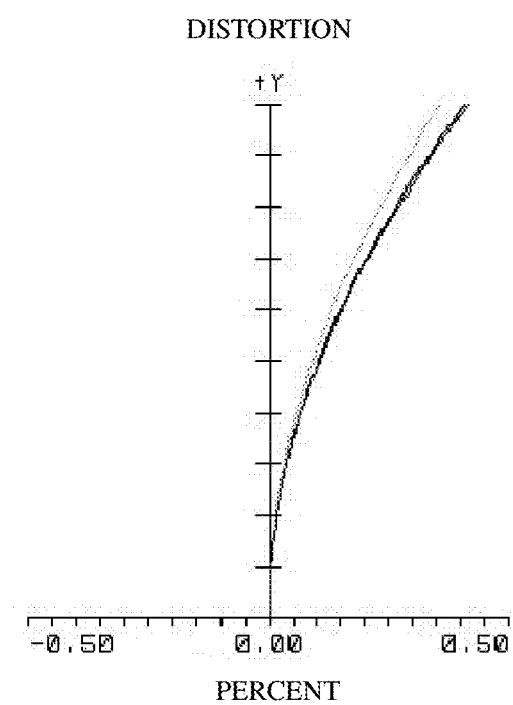
FIG. 5 is a graphic diagram showing distortion of the reconnaissance objective lens for the UAV according to one embodiment.

Referring to FIG. 1, an objective lens 100 according to one embodiment is mainly used for middle/low-altitude reconnaissance for an UAV. The objective lens 100 includes a first lens L1, a second lens L2, a third lens L3, a fourth lens L4, and a fifth lens L5.

The first lens L1 is a biconvex lens, which has a convex first surface S1 facing an object side and a convex second surface S2 facing an image side. A radius of curvature of the first surface S1 is 112 mm, and a radius of curvature of the second surface S2 is −150 mm (in the present specification, the propagation direction of the light is from the left side to the right side of the drawing. The positive or negative curvature radius of the lens is determined by taking a relative positional relationship between an intersection point of the curved surface and the principal optical axis and a center of the spherical surface of the curved surface. If the center of the spherical surface is in the left of the intersection point, the radius of curvature has a negative value, if, on the other hand, the center of the spherical surface is in the right of the intersection point, the radius of curvature has a positive value). The first lens L1 has a central thickness, i.e. a thickness d1 of the first lens L1 on an optical axis, of 12 mm. The first lens L1 has an outer diameter of Φ70 mm. The first lens L1 has a ratio of refractive index Nd1 to Abbe number Vd1 of 1.5/64. It should be understood that, the tolerance for the foregoing parameters is 5%, i.e., those parameters can vary within ±5%.

The second lens L2 is a biconcave lens, which is bonded to the first lens L1 to form a cemented lens. The second lens L2 has a concave third surface S3 towards the image side and a concave fourth surface S4 towards object side. A radius of curvature of the third surface S3 is −150 mm, and a radius of curvature of the fourth surface S4 is 250 mm. The second lens L2 has a central thickness d2 of 4 mm. The second lens L2 has an outer diameter of Φ70 mm. The second lens L2 has a ratio of refractive index Nd2 to Abbe number Vd2 of 1.7/32. It should be understood that, the tolerance for the foregoing parameters is 5%, i.e., those parameters can vary within ±5%.

The third lens L3 is a meniscus lens, which has a convex fifth surface S5 facing an object side and a concave sixth surface S6 facing an image side. A radius of curvature of the fifth surface S5 is 64 mm, and a radius of curvature of the sixth surface S6 is 150 mm. The third lens L3 has a central thickness d3 of 8 mm. The third lens L3 has an outer diameter of Φ60 mm. The third lens L3 has a ratio of refractive index Nd3 to Abbe number Vd3 of 1.63/62. An interval T1 between the third lens L3 and the second lens L2 (i.e. a distance on the optical axis between the fifth surface S5 and the fourth surface S4) is 0.5 mm. It should be understood that, the tolerance for the foregoing parameters is 5%, i.e., those parameters can vary within ±5%.

The reconnaissance objective lens 100 further includes an aperture A. The aperture A is located between the third lens L3 and the fourth lens L4 and is adjacent to the fourth lens L4. The aperture A is configured to control luminous flux entering the fourth lens L4.

The fourth lens L4 is also a meniscus lens, which has a concave seventh surface S7 facing an object side and a convex eighth surface S8 facing an image side. A radius of curvature of the seventh surface S7 is −31 mm, and a radius of curvature of the eighth surface S8 is −60 mm. The fourth lens L4 has a central thickness d4 of 2 mm. The fourth lens L4 has an outer diameter of Φ20 mm. The fourth lens L4 has a ratio of refractive index Nd4 to Abbe number Vd4 of 1.6/60. An interval T2 between the fourth lens L4 and the third lens L3 (i.e. a distance on the optical axis between the seventh surface S7 and the sixth surface S6) is 80 mm. It should be understood that, the tolerance for the foregoing parameters is 5%, i.e., those parameters can vary within ±5%.

The fifth lens L5 is also a meniscus lens, which is bonded to the fourth lens L4 to form a cemented lens. The fifth lens L5 has a concave ninth surface S9 facing an object side and a convex tenth surface S10 facing an image side. A radius of curvature of the ninth surface S9 is −60 mm, and a radius of curvature of the tenth surface S10 is −50 mm. The fifth lens L5 has a central thickness d5 of 4 mm. The fifth lens L5 has an outer diameter of Φ20 mm. The fifth lens L5 has a ratio of refractive index Nd5 to Abbe number Vd5 of 1.6/40. It should be understood that, the tolerance for the foregoing parameters is 5%, i.e., those parameters can vary within ±5%.

The foregoing reconnaissance objective 100 has the following parameters: f=200 mm, D/f=1:3.5.

In the illustrated embodiment, light is incident from the object side to the first lens L1, and pass through the second lens L2, the third lens L3, the aperture A, the fourth lens L4, and the fifth lens L5, thus forming an image on an imaging plane B. It should be understood that, an imaging system can be established by employing an image sensor (not shown), such as a CCD (Charge-Coupled Device) or CMOS (Complementary Metal Oxide Semiconductor), on the imaging plane B.

FIGS. 2 to 5 are graphic diagrams showing M.T.F, geometric aberration diagram, field curvature, and distortion of the reconnaissance objective lens for the UAV. As can be seen from figures, when the resolution reaches 50 line pairs/mm, M.T.F is 0.4, which is ideal. The size of the diffusion spot ΔΦ≈0.015, which is ideal. Either the fine beam aberration diagram or color aberration are corrected, distortion is also controlled in a very small range, thus the low-altitude detection of distortion requirements are met.

Not only the reconnaissance objective lens for the UAV processes advantages such as small size, large imaging frame, high clarity, high resolution, low distortion, large field of view, but it also processes advantages such as large information volume, high efficiency, greatly reduced cost.

Although the description is illustrated and described herein with reference to certain embodiments, the description is not intended to be limited to the details shown. Modifications may be made in the details within the scope and range equivalents of the claims.

What is claimed is:

1. A reconnaissance objective lens for an UAV, comprising: a first lens, a second lens, a third lens, a fourth lens, and a fifth lens, which are successively coaxially configured along a transmission direction of incident light; wherein the first lens is a biconvex lens, the second lens is a biconcave lens, the third lens is a meniscus lens, the fourth lens is a meniscus lens, and the fifth lens is a meniscus lens; wherein the first lens is bonded to the second lens, the fourth lens is bonded to the fifth lens; wherein the first lens has a first surface and a second surface, the second lens has a third surface and a fourth surface, the third lens has a fifth surface and a sixth surface, the fourth lens has a seventh surface and an eighth surface, the fifth lens has a ninth surface and a tenth surface; the first surface to the tenth surface are successively arranged along the transmission direction of the incident light; wherein radii of curvature of the first surface to the tenth surface are 112 mm, −150 mm, −150 mm, 250 mm, 64 mm, 150 mm, −31 mm, −60 mm, −60 mm, and −50 mm, respectively; wherein central thicknesses of the first lens to the fifth lens are 12 mm, 4 mm, 8 mm, 2 mm, and 4 mm, respectively.

2. The reconnaissance objective lens for the UAV according to claim 1, wherein ratios of refractive index to Abbe number of the first lens to the fifth lens are 1.5/64, 1.7/32, 1.63/62, 1.6/60, 1.6/40, respectively.

3. The reconnaissance objective lens for the UAV according to claim 1, wherein an interval between the second lens and the third lens is 0.5 mm; an interval between the third lens and the fourth lens is 80 mm.

4. The reconnaissance objective lens for the UAV according to claim 1, wherein outer diameters of the first lens, the second lens, the third lens, the fourth lens, the fifth lens are 70 mm, 70 mm, 60 mm, 20 mm, and 20 mm, respectively.

5. The reconnaissance objective lens for the UAV according to claim 1, further comprising an aperture, wherein the aperture is provided on an image side of the fourth lens and configured to control luminous flux entering the fourth lens.

6. The reconnaissance objective lens for the UAV according to claim 1, wherein tolerance ranges of the radii of curvature, the central thicknesses, and the intervals are 5%.

* * * * *